(12) United States Patent
Wang

(10) Patent No.: US 9,787,658 B2
(45) Date of Patent: Oct. 10, 2017

(54) LOGIN SYSTEM BASED ON SERVER, LOGIN SERVER, AND VERIFICATION METHOD THEREOF

(71) Applicant: Tencent Technology (Shenzhen) Company Limited, Shenzhen (CN)

(72) Inventor: Yang Wang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 14/460,263

(22) Filed: Aug. 14, 2014

(65) Prior Publication Data

US 2015/0113265 A1    Apr. 23, 2015

Related U.S. Application Data

(63) Continuation of application No. PCT/CN2014/079392, filed on Jun. 6, 2014.

(30) Foreign Application Priority Data

Oct. 17, 2013   (CN) .......................... 2013 1 0487755

(51) Int. Cl.
*H04L 29/06*   (2006.01)
(52) U.S. Cl.
CPC .................... *H04L 63/08* (2013.01)
(58) Field of Classification Search
USPC ............ 713/155, 150, 151, 163, 181; 7/155; 726/2, 21, 36; 380/255, 264, 276
See application file for complete search history.

(56) References Cited

U.S. PATENT DOCUMENTS 7,865,736 B2   1/2011   Dai et al.
2002/0095573 A1*   7/2002   O'Brien ............. H04L 63/0823
                                                                    713/168

(Continued)

FOREIGN PATENT DOCUMENTS

CN   101267299 A   9/2008
CN   101534434 A   9/2009

(Continued)

OTHER PUBLICATIONS

Tencent Technology, ISR, PCT/CN2014/079392, Sep. 10, 2014, 3 pgs.

(Continued)

*Primary Examiner* — Hadi Armouche
*Assistant Examiner* — Sharif E Ullah
(74) *Attorney, Agent, or Firm* — Morgan, Lewis & Bockius LLP

(57) ABSTRACT

A method performed by a login server with memory and one or more processors are described. The method includes receiving a login request from a computer system; determining whether an identity of the computer system matches a preset standard; and, in accordance with a determination that the identity of the computer system does not match the preset standard, denying the login request. The login server and its components, and a computer readable storage medium storing one or more programs for execution by one or more processors of the login server are also described.

15 Claims, 4 Drawing Sheets

(56) References Cited

U.S. PATENT DOCUMENTS

2006/0068756 A1* 3/2006 Aberg ................ H04L 63/18
455/411
2013/0262873 A1* 10/2013 Read ................. H04W 12/06
713/186

FOREIGN PATENT DOCUMENTS

| CN | 101561815 A | 10/2009 |
| --- | --- | --- |
| CN | 101841549 A | 9/2010 |
| CN | 101997685 A | 3/2011 |
| CN | 102984046 A | 3/2013 |
| CN | 103067332 A | 4/2013 |
| CN | 103269349 A | 8/2013 |

OTHER PUBLICATIONS

Tencent Technology, Written Opinion, PCT/CN2014/079392, Sep. 10, 2014, 4 pgs.
Tencent Technology, IPRP, PCT/CN2014/079392, Apr. 19, 2016, 5 pgs.

* cited by examiner

LOGIN SYSTEM BASED ON SERVER, LOGIN SERVER, AND VERIFICATION METHOD THEREOF

RELATED APPLICATIONS

This application is a continuation application of PCT Patent Application No. PCT/CN2014/079392, entitled "LOGIN SYSTEM BASED ON SERVER, LOGIN SERVER, AND VERIFICATION METHOD THEREOF" filed on Jun. 6, 2014, which claims priority to Chinese Patent Application Serial No. 201310487755.4, entitled "LOGIN SYSTEM BASED ON SERVER, LOGIN SERVER, AND VERIFICATION METHOD THEREOF" filed on Oct. 17, 2013, both of which are incorporated by reference herein in their entirety.

TECHNICAL FIELD

The present application relates to the field of Internet technologies, and in particular, to a login system based on a server, a login server, and a verification method thereof.

BACKGROUND

Development of Internet technologies continues to demand higher security requirements.

A browser game based on the Internet is used as an example. To integrate game resources, generally, a joint operation platform party integrates games provided by multiple game providers into a same web page and presents them to a client. From the perspective of technologies, the joint operation platform party integrates, through a joint operation platform server, game data provided by the multiple game providers by using a game server, so as to form a game system. To ensure security of the game server, in the game system, a login server (which may also be understood as a login interface) is generally set between the joint operation platform server and the game server. The main function of the login server is to verify a login request from the joint operation platform server. If the verification succeeds, the login of the client is accepted and the web page jumps to a corresponding game server. If the verification fails, a wrong address is returned to the joint operation platform server, and the login of the client is rejected.

For example, FIG. 1 is a schematic flowchart of a method for logging in to a game server in the prior art.

Step S1. The client initiates a login request to the joint operation platform server.

Step S2. The joint operation platform server adds a timestamp for the login request, performs encryption on the login request according to a preset external key, so as to generate an external signature, and sends request parameters that include the timestamp and the external signature to the login server.

Step S3. The login server performs decryption on the external signature from the joint operation platform server, and determines whether the timestamp has timed out. Once the decryption succeeds and it is verified that the timestamp has not timed out, perform step S4; or, once the decryption fails or it is verified that the timestamp has timed out, perform step S5.

Step S4. If the login succeeds, jump to the game server.

Step S5. If the login fails, return a wrong address to the joint operation platform server. In the prior art, verification is performed only on the timestamp and the external signature for the login request from the joint operation platform server.

If another joint operation platform server outside the system steals the login request, and the stolen login request conforms to related parameters in the system, the stolen login request may be used to circumvent a zone selection page of the joint operation platform server in the system and to request logging in to the game server, thereby implementing access to the game server, presenting an extremely great security threat to the game server.

In addition, once external keys of the joint operation platform server in the system and the login server are leaked, a third party may still perform encryption on the login request according to the stolen external key, and may also easily pass the verification of the login server, presenting an extremely great security threat to the game server.

Therefore, it is necessary to solve the technical problem in the prior art that an extremely great threat is present to login security of a server because the login request can be stolen easily and the external key may be leaked easily.

SUMMARY

The above-discussed technical problems are addressed by methods and systems described below.

In accordance with some embodiments, a method is performed by a login server with memory and one or more processors. The method includes receiving a login request from a computer system; determining whether an identity of the computer system matches a preset standard; and, in accordance with a determination that the identity of the computer system does not match the preset standard, denying the login request.

In accordance with some embodiments, a login server includes one or more processors; and memory storing one or more programs for execution by the one or more processors. The one or more programs include instructions for: receiving a login request from a computer system; determining whether an identity of the computer system matches a preset standard; and, in accordance with a determination that the identity of the computer system does not match the preset standard, denying the login request.

In accordance with some embodiments, a computer readable storage medium stores one or more programs for execution by one or more processors of a login server. The one or more programs include instructions for: receiving a login request from a computer system; determining whether an identity of the computer system matches a preset standard; and, in accordance with a determination that the identity of the computer system does not match the preset standard, denying the login request.

BRIEF DESCRIPTION OF THE DRAWINGS

The aforementioned features and advantages thereof as well as additional features and advantages thereof will be more clearly understood hereinafter as a result of a detailed description of embodiments when taken in conjunction with the drawings.

Like reference numerals refer to corresponding parts throughout the several views of the drawings.

DESCRIPTION OF EMBODIMENTS

Figure 1:
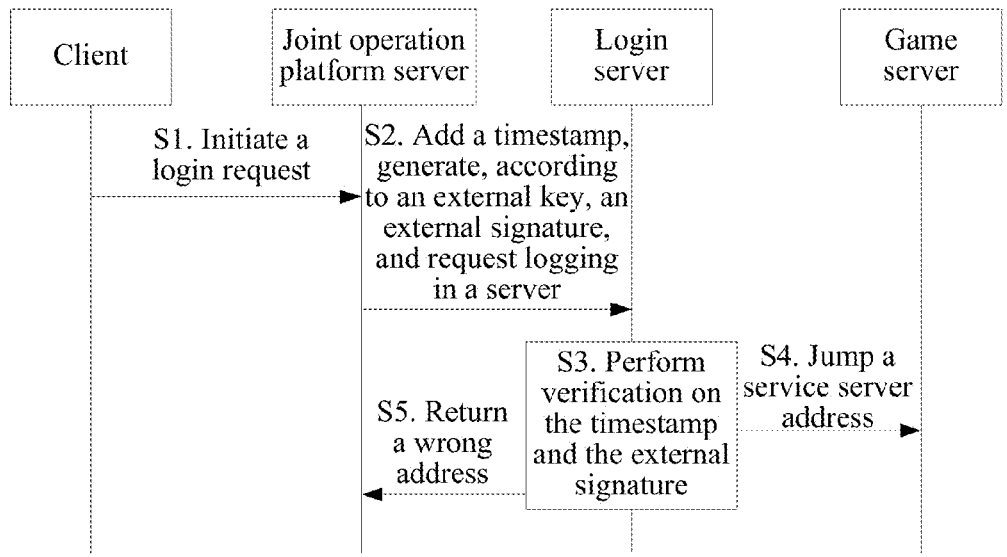
FIG. 1 is a schematic flowchart of a method for logging in to a game server in the prior art.

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

Referring to drawings, where like reference numerals refer to corresponding parts throughout the several views of the drawings, several principles are described by using implementations in a proper computing environment as an example. The following descriptions are based on illustrated specific embodiments of the present application, which should not be deemed as limitations to other specific embodiments of the present application that are not described in detail here.

In the following descriptions, specific embodiments are described with reference to steps performed by one or more computers, unless otherwise specified. The steps and operations are performed by a computer, and computer implementations mentioned herein include operations of a computer processing unit on data of a particular structure. The operation converts the data or keeps the data in a location in a memory system of the computer. It would be possible to reconfigure or otherwise change operations of the computer in a manner known by a person skilled in the art. The data is stored in specific physical locations of the memory, which has specific characteristics that are defined by a format of the data. However, the embodiments described herein are not intended to limit the scope of claims. Rather, a person skilled in the art may know multiple steps and operations described below, and may implement the steps and operations in hardware.

The principles described herein can be implemented using one or more computing and/or communication devices. Known examples of applicable computing systems, environments, and configurations may include, but not limited to, a handheld telephone, a personal computer, a server, a multiprocessor system, a microcomputer-based system, a master-architecture-type computer, and a distributed computing environment, where any of the foregoing systems or apparatuses are included.

The terminology "module" used herein may be deemed as a software object executed on a computing system. Different components, modules, engines, and services described herein may be deemed as objects implemented on the computing system. In some embodiments, the subject matter described herein are implemented in software, and in some other embodiments, it is implemented in hardware.

Figure 2:
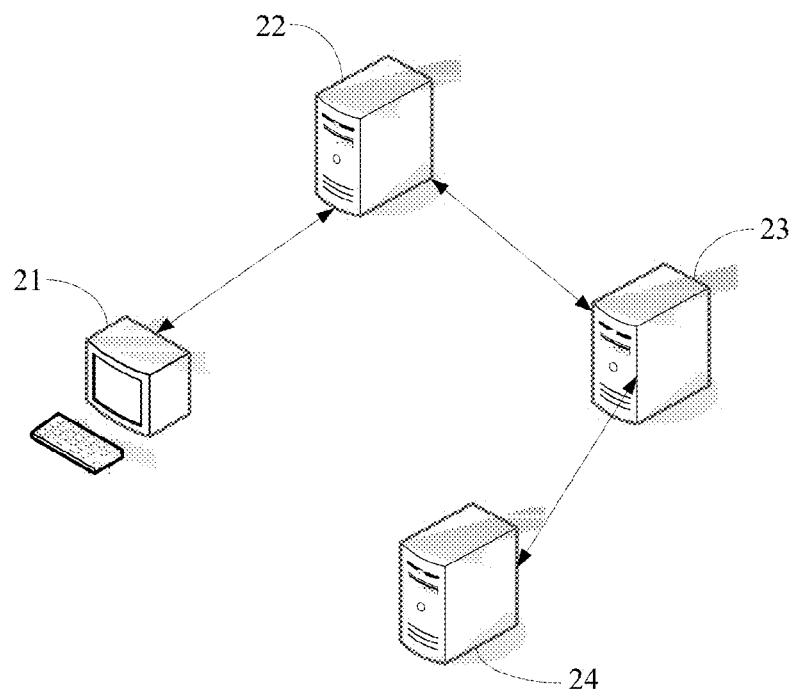
FIG. 2 is a schematic structural diagram of a login system based on a server according to some embodiments.

FIG. 2 is a schematic structural diagram of a login system based on a server according to an embodiment of the present application. The system includes a client 21, a platform server 22, a login verification server 23, and a service server 24.

The client 21 is a communications terminal apparatus used by a user to use a network service, which may receive and send information by connecting to the foregoing server by using a communications network. The client 21 may be a desktop computer or a terminal device that has a storage unit and an arithmetic capability for having a microprocessor installed, such as a notebook computer, a workstation, a palmtop computer, a UMPC (ultra mobile personal computer: ultra mobile personal computer), a tablet PC, a personal digital assistant (Personal Digital Assistant, PDA), a web pad (web pad), and a cellular phone, and the like.

A communications network may include a data communication network that includes a local area network (local area network, LAN), a metropolitan area network (metropolitan area network, MAN), a wide area network (wide area network, WAN), the Internet, and the like, and further includes a telephone network, no matter wired or wireless, and irrelevant to whatever communication method that is used.

The platform server 22 may provide a corresponding network service for the user, for example, a browser game link, while the service server 24 provides a corresponding service (e.g., browser game service) to the user, and the login verification server 23 verifies a login request from the platform server 22. Here, the service server 24, for example, may be a game server, or the like, and the platform server 22 is, for example, a game platform server.

The user may open the network service provided by the platform server 22, by using the client 21, for example, by clicking a browser game link. The platform server 22 stores in advance a service identity of each service server 24 (for example, a serial number). When the user opens a network service, the platform server 22 performs the following actions: generating a login request, matching with a service identity of a corresponding service server 24, generating a timestamp and adding the timestamp into the login request, adding a platform identity of the platform server 22 into the login request, and generating an external signature by performing encryption on the login request according to a preset external key. Subsequently, the platform server 22 sends request parameters such as the login request, the service identity of the service server 24, the timestamp, the external signature, and the platform identity of the platform server 22, to the login verification server 23.

Here, the external key is an interaction protocol between the platform server 22 and the login verification server 23, and the login verification server 23 may perform, according to the corresponding interaction protocol, decryption on the external signature that is generated by encryption according to the foregoing external key.

After receiving the request parameters (presumably from the platform server 22), the login verification server 23 first determines whether the foregoing request parameters are complete. If it is determined that the foregoing request parameters are complete, the login verification server 23 first verifies the received platform identity of the platform server 22 and determines whether the received platform identity is from the platform server 22 in the system. Once it is determined that the received platform identity is not from the platform server 22 in the system, the login verification server 23 returns a wrong identity (e.g., information indicating that the received platform identity is not from the platform server 22) to the platform server 22. Once it is determined that the platform identity is from the platform server 22 in the system, the login verification server 23 continues to perform verification on the timestamp and determines whether the timestamp has timed out. If the timestamp has not timed out, the login verification server 23 continues to determine the service identity of the service server 24. The login verification server 23 determines whether the service identity of the service server 24 is right (e.g., whether the service identity of the service server 24 is a service identity that is stored in an identity database in advance). If it is determined that the service identity of the service server 24 is the service identity that is stored in the identity database in advance, the login verification server 23 further determines whether the external signature can be decrypted successfully. Here, the identity database in some embodiments stores the service identity of the service server 24 in the system, where the service identity is, for example, a number, or the like. The decrypted external signature includes information that is used to determine whether the external signature is from the platform server 22 in the system. The login verification server 23 continues to generate an internal signature according to an internal key, and sends the internal signature to the corresponding service server 24 to perform login. Here, the internal key is an interaction protocol between the login verification server 23 and the service server 24.

After receiving the internal signature, the service server 24 performs decryption of the internal signature according to the internal key. Once the decryption succeeds, the service server 24 accepts login of the client 21 to the service server 24. In some embodiments, only an internal signature that is encrypted with the internal key can be decrypted by the service server 24. Even if the external key is stolen, verification can still be performed, by using the aforementioned internal key, on a login request, thereby ensuring security of the service server 24.

Compared with the prior art, in some embodiments, the login verification server 23 verifies request parameters from the platform server 22 in two aspects: first, the login verification server 23 verifies the platform identity of the platform server 22, which ensures that the aforementioned request parameters are sent from the platform server 22 in the system, and prevents illegal login of another platform server from outside the system; second, the login verification server 23 verifies the service identity of the service server 24, and determines whether the service identity is in the identity database that is stored in advance, which prevents illegal login of a non-affiliate party.

In addition, compared with the prior art, in some embodiments, the login verification server 23 further generates an internal signature according to an internal key to request logging in to the service server 24, where the internal key is an interaction protocol between the login verification server 23 and the service server 24, and therefore, only the corresponding service server 24 can decrypt the internal signature. In this way, even if an external key is revealed, an illegal request still cannot circumvent the login verification server 23, thereby avoiding illegal access to the service server 24, and ensuring login security.

Figure 3:
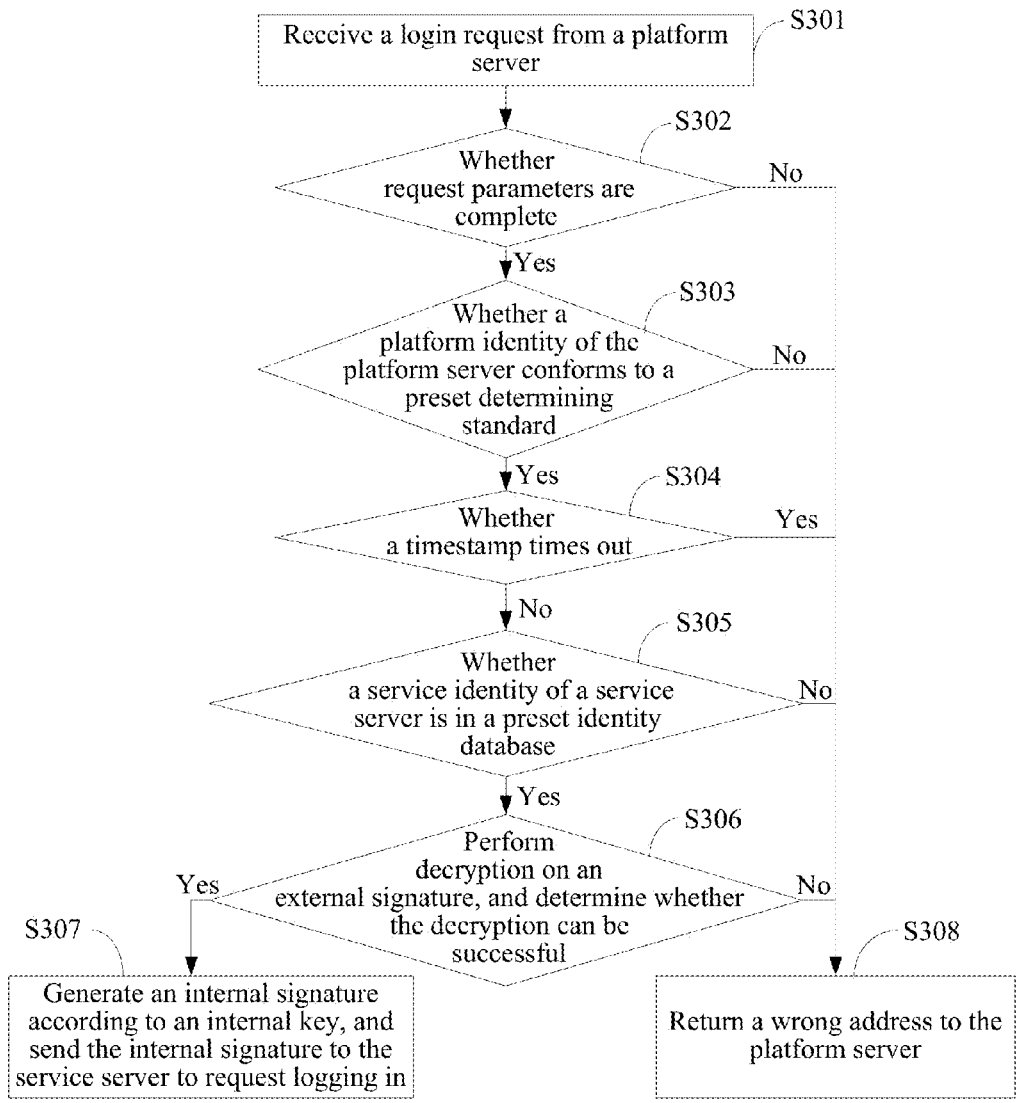
FIG. 3 is a schematic flowchart of a verification method for a login verification server according to some embodiments.

FIG. 3 is a schematic flowchart of a verification method for a login verification server according to some embodiments.

In step S301, the login verification server 23 receives a login request from a platform server 22.

In this embodiment, the login request includes request parameters, a timestamp, an external signature generated by an external key, a platform identity of the platform server 22, and a service identity of a service server 24. Here the external key is an interaction protocol between the platform server 22 and the login verification server 23, and an external signature that is from the platform server 22 and encrypted by using the external key can only be decrypted by the login verification server 23 that has the external key, thereby ensuring login security. A platform identity of the platform server 22 is the only identity of the platform server 22, used to uniquely identify the platform server 22. In some embodiments, the platform identity is, for example, a source website field in the Hypertext Transfer Protocol (e.g., a referrer field (which is commonly called a referrer field) in a header of an HTTP request). The service identity of the service server 24 is an identity that is stored in an identity database in advance. For example, in some embodiments, the identity database stores a service identity of a service server 24 that is associated with the platform server 22, and the service identity of the service server 24 is, for example, a unique number of the service server 24.

In step S302, the login verification server 23 verifies the request parameters, and determines whether the request parameters are complete. If it is determined that the request parameters are complete, step S303 is performed; otherwise, step S308 is performed.

In step S303, the login verification server 23 verifies the platform identity of the platform server 22, and determines whether the platform identity of the platform server 22 conforms to a preset determination standard. If the platform identity of the platform server 22 conforms to the preset determination standard, step S304 is performed; otherwise, step S308 is performed.

In some embodiments, the platform identity is, for example, a source website field in the Hypertext Transfer Protocol (e.g., a referrer field in a header of an HTTP request). In some embodiments, the platform identity may be another platform identity, as long as it can uniquely identify the platform server 22. In some embodiments, the determining standard includes determining whether the referrer field includes a domain name of the platform server 22.

In step S304, the login verification server 23 verifies the timestamp, and determines whether the timestamp has timed out. If the time stamp has timed out, step S308 is performed; otherwise, step S305 is performed.

In step S305, the login verification server 23 verifies the service identity of the service server 24, and determines whether the service identity of the service server 24 is stored in a preset identity database. If the service identity of the service server 24 is stored in the preset identity database, step S306 is performed; otherwise, step S308 is performed.

Here, the service identity of the service server 24 is an identity that is stored in an identity database in advance, where the identity database stores a service identity of a service server 24 that is associated with the platform server 22, and the service identity of the service server 24 is, for example, a unique number of the service server 24.

In step S306, the login verification server 23 performs decryption on the external signature according to the external key, and determines whether the decryption can be successful. If the decryption can be successful, step S307 is performed; otherwise, step S308 is performed.

Here, before sending the login request to the login verification server, the platform server 22 first generates the external signature according to a preset external key, and sends the external signature to the login verification server 23. In some embodiments, the external signature is an interaction protocol between the platform server 22 and the login verification server 23, and therefore, only an external signature that is sent by the platform server 22 that has the external key can be decrypted successfully by the login verification server 23 using the external key. The decrypted external key is used to determine that the external signature has been sent from the platform server 22, thereby ensuring login security.

Definitely, in a specific implementation process, a sequence of verification on the foregoing request parameters may be adjusted flexibly, for example, decryption may be performed on an external signature first, and subsequently, verification is performed on a timestamp, which all fall within the protection scope of the embodiment of the present application.

In step S307, the login verification server 23 generates an internal signature according to an internal key, and sends the internal signature to the corresponding service server 24 to request logging in.

In the embodiment of the present application, the internal key is an interaction protocol between the login verification server 23 and the service server 24, that is, only an internal signature that is encrypted by using the internal key of the login verification server 23 can be decrypted by the service server 24 by using the internal key, thereby further improving login security.

In step S308, a wrong address is returned to the platform server 22. In some embodiments, information indicating that the login has been rejected is sent to the platform server 22.

Figure 4:
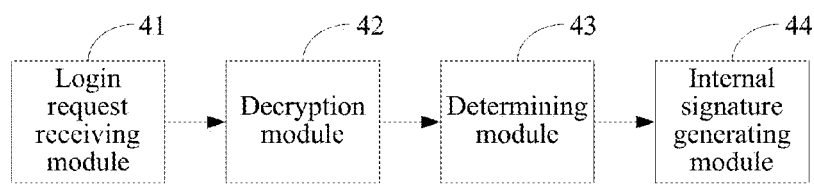
FIG. 4 is a schematic structural diagram of a login verification server according to some embodiments.

FIG. 4 is a schematic diagram of an internal structure of a login verification server according to some embodiments. In some embodiments, the login verification server includes a login request receiving module 41, a decryption module 42, a determining module 43, and an internal signature generating module 44. The login request receiving module 41 receives a login request from the platform server 22. The login request includes request parameters, a timestamp, an external signature generated by an external key, a platform identity of the platform server 22, and a service identity of a corresponding service server 24. The external key is an interaction protocol between the platform server 22 and the login verification server 23, and therefore, only an external signature that is encrypted by the platform server 22 can be decrypted by the login verification server 23. The platform identity of the platform server 22 uniquely identifies the platform server 22. In some embodiments, the platform identity is, for example, a source website field in the Hypertext Transfer Protocol (e.g., if the login request is an HTTP request, a referrer field in a header of the HTTP request). In some embodiments, the service identity of the service server 24 is a service identity stored in an identity database in advance. The identity database stores a service identity of a service server 24 that is associated with the platform server 22. In some embodiments, the service identity of the service server 24 is, for example, a unique number of the service server 24.

After the login request receiving module 41 receives the login request from the platform server 22, the decryption module 42 performs decryption on the external signature according to the external key, and the determining module 43 determines whether the decryption succeeds. If yes, the determining module 43 further determines whether the platform identity of the platform server 22 conforms to a preset determining standard.

In some embodiments, the platform identity is, for example, a source website field in the Hypertext Transfer Protocol (e.g., a referrer field in a header of an HTTP request). Definitely, it may also be another platform identity, as long as it can uniquely identify the platform server 22. The determining standard includes determining whether the referrer field is from a domain name of the platform server 22.

If the determining module 43 determines that the platform identity of the platform server 22 conforms to a preset determining standard, the determining module 43 further verifies the service identity of the service server 24 (e.g., determines whether the service identity is in a preset identity database). In some embodiments, the service identity of the service server 24 is stored in the identity database in advance, and the identity database stores a service identity of a service server 24 that is associated with the platform server 22. In some embodiments, the service identity of the service server 24 is, for example, a unique number of the service server 24.

If the determining module 43 determines that the service identity is in the preset identity database, the internal signature generating module 44 generates an internal signature according to a preset internal key, and sends the internal signature to the service server 24 to request logging in. In some embodiments, the service identity in the login request corresponds to the service server 24. The internal key is an interaction protocol between the login verification server 23 and the service server 24, and an internal signature that is encrypted by using the internal key of the login verification server 23 can be decrypted by the service server 24 only by using the internal key, thereby further improving login security.

In some embodiments, the determining module 43 further verifies request parameters, a timestamp, and the like in the login request.

Figure 5:
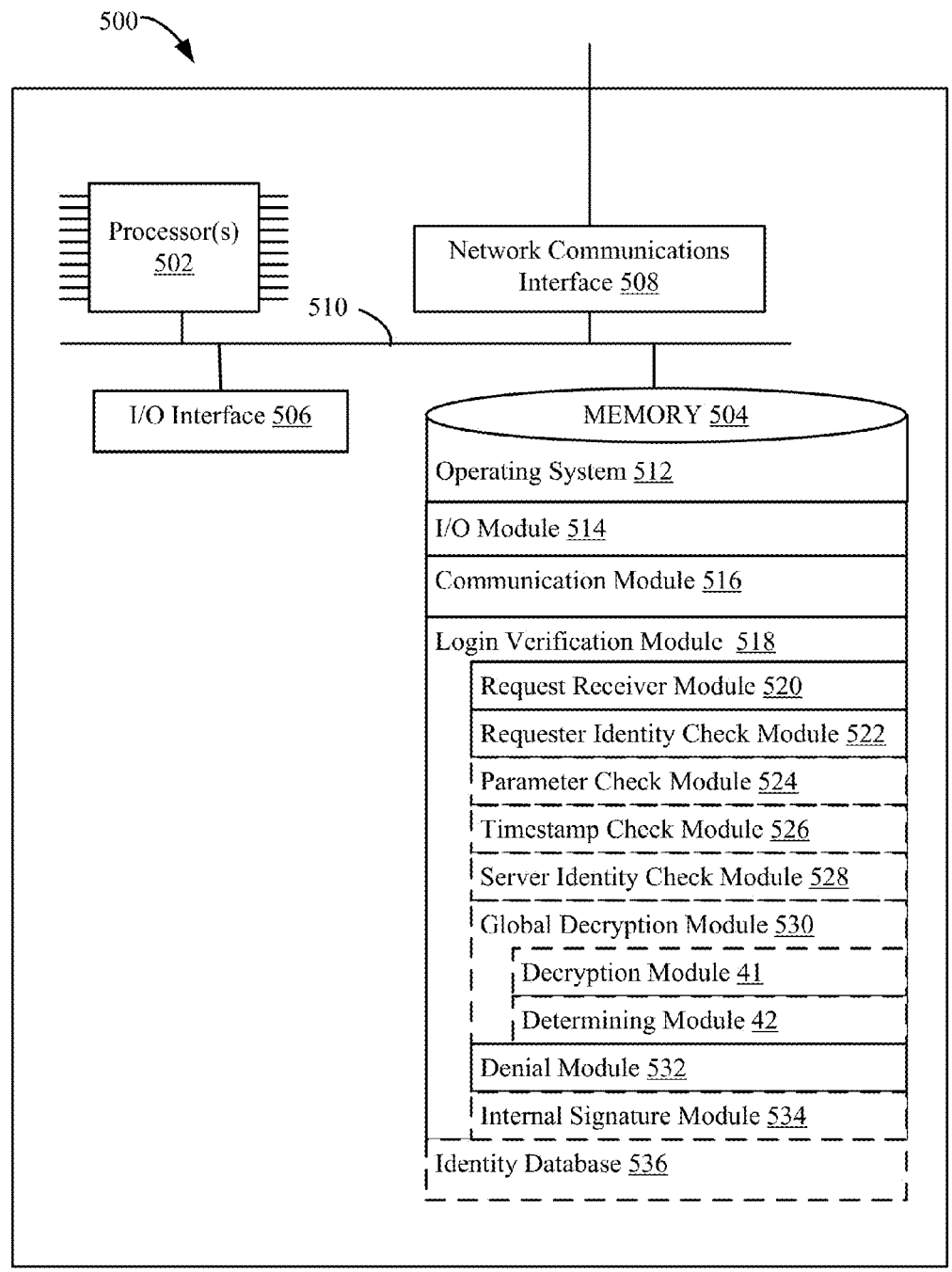
FIG. 5 is a block diagram of a login verification server in accordance with some embodiments.

FIG. 5 is a block diagram of a login verification server 500 (also called herein a login server) in accordance with some embodiments. In some embodiments, the login verification server 500 corresponds to the login verification server 23 described above with respect to FIG. 2.

In some embodiments, the login verification server 500 comprises one or more servers (also called server computers) or server modules.

As shown in FIG. 5, the server 500 includes one or more processing units (also called herein "processors") 502, memory 504, an input/output (I/O) interface 506, and a network communications interface 508. These components communicate with one another over one or more communication buses or signal lines 510. In some embodiments, the memory 504, or the computer readable storage media of memory 504, stores programs, modules, instructions, and data structures including all or a subset of: an operating system 512, an I/O module 514, a communication module 516, and a login verification module 518. The one or more processors 502 are coupled to the memory 504 and operable to execute these programs, modules, and instructions, and reads/writes from/to the data structures.

In some embodiments, the memory 504 includes an identity database 536.

In some embodiments, the processing units 502 include one or more microprocessors, such as a single core or multi-core microprocessor. In some embodiments, the processing units 502 include one or more general purpose processors. In some embodiments, the processing units 502 include one or more special purpose processors.

In some embodiments, the memory 504 includes high-speed random access memory, such as DRAM, SRAM, DDR RAM or other random access solid state memory devices. In some embodiments the memory 504 includes non-volatile memory, such as one or more magnetic disk storage devices, optical disk storage devices, flash memory devices, or other non-volatile solid state storage devices. In some embodiments, the memory 504 includes one or more storage devices remotely located from the processing units 502. The memory 504, or alternately the non-volatile memory device(s) within the memory 504, comprises a computer readable storage medium. In some embodiments, the memory 504 comprises a non-transitory computer readable storage medium.

In some embodiments, the I/O interface 506 couples one or more input/output devices, such as one or more displays (e.g., a touch-sensitive display, also called a touch screen), a keyboards, touch screens, speakers, and microphones, to the I/O module 514 of the server 500. The I/O interface 506, in conjunction with the I/O module 514, receive user inputs (e.g., voice input, keyboard inputs, touch inputs, etc.) and process them accordingly. The I/O interface 506 and the I/O module 514 also present outputs (e.g., sounds, images, text, etc.) to the user according to various program instructions implemented on the server 500.

In some embodiments, the network communications interface 508 includes wired communication port(s) and/or wireless transmission and reception circuitry. The wired communication port(s) receive and send communication signals via one or more wired interfaces, e.g., Ethernet, Universal Serial Bus (USB), FIREWIRE, etc. The wireless circuitry receives and sends RF signals and/or optical signals from/to communications networks and other communications devices. The wireless communications may use any of a plurality of communications standards, protocols and technologies, such as GSM, EDGE, CDMA, TDMA, Bluetooth, WiFi, VoIP, Wi-MAX, or any other suitable communication protocol. The network communications interface 508 enables communication between the server 500 with networks, such as the Internet, an intranet and/or a wireless network, such as a cellular telephone network, a wireless local area network (LAN) and/or a metropolitan area network (MAN), and other devices. The communications module 516 facilitates communications between the server 500 and other devices (e.g., the first client device and the second client device) over the network communications interface 508.

In some embodiments, the operating system 512 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

It should be noted that the server 500 is only one example, and that the server 500 may have more or fewer components than shown, may combine two or more components, or may have a different configuration or arrangement of the components. The various components shown in FIG. 5 may be implemented in hardware, software, firmware, including one or more signal processing and/or application specific integrated circuits, or a combination of thereof.

In FIG. 5, the login verification module 518 stored in the memory 504 include the following modules or a subset or a superset thereof:
Request Receiver Module 518 configured for receiving a login request from a computer system;
Requester Identity Check Module 522 configured for determining whether an identity of the computer system matches a preset standard;
Parameter Check Module 524 configured for determining whether parameters in the login request are complete;
Timestamp Check Module 526 configured for determining whether a timestamp associated with the login request has timed out;
Server Identity Check Module 528 configured for determining whether an identity of a service server is included in the identity database 536;
Global Decryption Module 530 configured for performing decryption operations;
Denial Module 532 configured for denying the login request; and
Internal Signature Module 534 configured for generating an internal signature encrypted with an internal key.

In some embodiments, the global decryption module 530 includes the decryption module 42 and the determining module 43 described above with respect to FIG. 4.

Details of the structures, functions, and interactions of these modules are provided with respect to FIGS. 1-4 and 6 and accompanying descriptions.

Figure 6:
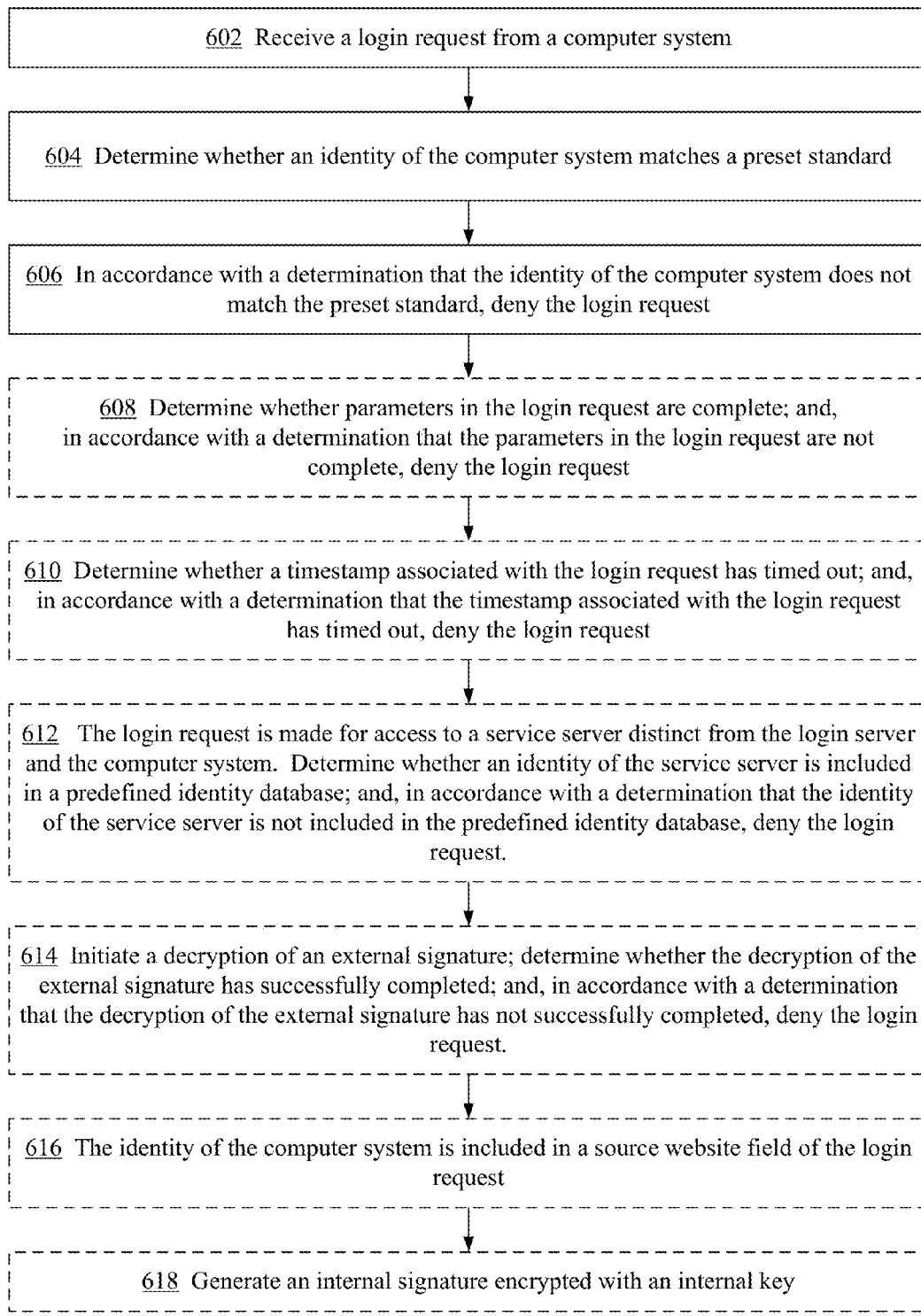
FIG. 6 illustrates a flow chart of an exemplary method for processing a login request at a login server in accordance with some embodiments.

FIG. 6 illustrates a flow chart of an exemplary method 600 for processing a login request at a login server in accordance with some embodiments.

The method is performed by a login server (e.g., the login verification server 500 in FIG. 5) with memory and one or more processors.

The login server receives (602) a login request from a computer system (e.g., the platform server 22 in FIG. 2). In some embodiments, the login request is sent from the client 21 (FIG. 2) to the platform server 22. The platform server 22 receives the login request from the client 21, and forwards the login request to the login server. In some embodiments, the login request receives an identity of the computer system concurrently with the login request (e.g., in some embodiments, the login request includes the identity of the computer system). In some embodiments, the login server receives the identity of the computer system separate from the login request.

The login server determines (604) whether the identity of the computer system matches a preset standard. In some embodiments, determining whether the identity of the computer system matches the preset standard includes determining whether a domain name of the computer system (e.g., the platform server 22) is received with the login request.

The login server, in accordance with a determination that the identity of the computer system does not match the preset standard, denies (606) the login request. In some embodiments, the login server sends to the computer system a message indicating that the login request has been denied.

In some embodiments, the login server determines (608) whether parameters in the login request are complete; and, in accordance with a determination that the parameters in the login request are not complete, denying the login request.

In some embodiments, the login server determines whether the identity of the computer system matches one or more preselected identities (e.g., identifies of platform servers), and in accordance with a determination that the identity of the computer system does not match one or more preselected identities, denies the login request. This blocks a login request through an unauthorized platform server.

In some embodiments, the login server determines (610) whether a timestamp associated with the login request has timed out; and, in accordance with a determination that the timestamp associated with the login request has timed out, denies the login request.

In some embodiments, the login request is made (612) for access to a service server (e.g., a game server) distinct from the login server and the computer system. For example, the client generates the login request for receiving services from the service server. In some embodiments, the login server determines whether an identity of the service server is included in a predefined identity database (e.g., identity database 536 in FIG. 5); and, in accordance with a determination that the identity of the service server is not included in the predefined identity database, denies the login request.

In some embodiments, the login server initiates (614) a decryption of an external signature (e.g., using the decryption module 42 in FIG. 4); determines whether the decryption of the external signature has successfully completed (e.g., using the determining module 43 in FIG. 4); and, in accordance with a determination that the decryption of the external signature has not successfully completed, denies the login request.

In some embodiments, the identity of the computer system is included (616) in a source website field of the login request. In some embodiments, the login request is sent in accordance with the Hypertext Transfer Protocol (HTTP), and an HTTP header of the login request includes a referrer (also called a referrer) information, identifying the identity of the computer system.

In some embodiments, the login server generates (618) an internal signature encrypted with an internal key. In some embodiments, the login server determines whether the login request has been denied, and in accordance with a determination that the login request has not been denied, generates the internal signature encrypted with the internal key. In some embodiments, the login server sends the internal signature to the service server.

While particular embodiments are described above, it will be understood that the scope of claims are not limited to these particular embodiments. On the contrary, the claims include alternatives, modifications and equivalent embodiments that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used herein is for the purpose of describing particular embodiments only and is not intended to limit the scope of claims. As used in the description and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of claims to the precise forms disclosed. Many modifications and variations are possible in view of the above teachings. The embodiments were chosen and described in order to best explain the principles described herein and their practical applications, to thereby enable others skilled in the art to best utilize various embodiments with various modifications as are suited to the particular use contemplated.

What is claimed is:

1. A method performed by a login server with memory and one or more processors, the method comprising:
   selecting a plurality of platform servers as authorized platform servers, and assigning each authorized platform server a preset identifier stored in a predefined identifier database of the login server;
   receiving a login request from a platform server, wherein:
      the login request is made for access to a service server that is distinct from the login server and the platform server,
      the login request is generated by the platform server in response to receiving, from a client device that is distinct and separate from the login server, the platform server, and the service server, a request for access to the service server, and
      the platform server adds an identifier of the platform server and an identifier of the service server to the login request when generating the login request and the identifier of the platform server is included in a source website field of the login request;
   determining whether the identifier of the platform server matches the preset identifier of a respective authorized platform server of the plurality of authorized platform servers and whether the identifier of the service server is included in the predefined identifier database;
   in accordance with a determination that the identifier of the platform server does not match the preset identifier of the respective authorized platform server, that the identifier of the service server is not included in the predefined identity database, and that a timestamp associated with the login request has timed out, denying the login request; and,
   in accordance with a determination that the identifier of the platform server matches the preset identifier of the respective authorized platform server, generating an internal signature encrypted with an internal key and sending the encrypted internal signature to the service server for accessing services hosted by the service server after the service server decrypts the internal signature successfully.

2. The method of claim 1, further comprising:
   determining whether parameters in the login request are complete; and, in accordance with a determination that the parameters in the login request are not complete, denying the login request.

3. The method of claim 1, further comprising:
initiating a decryption of an external signature;
determining whether the decryption of the external signature has successfully completed; and,
in accordance with a determination that the decryption of the external signature has not successfully completed, denying the login request.

4. The method of claim 1, further comprising:
in response to receiving the login request from the computer system:
   storing the login request in the memory of the login server; and
   extracting the identifier of the platform server from the login request stored in the memory of the login server.

5. The method of claim 1, wherein the login request includes information identifying the service server.

6. A login server, comprising:
one or more processors; and
memory storing one or more programs for execution by the one or more processors, the one or more programs including instructions for:
   selecting a plurality of platform servers as authorized platform servers, and assigning each authorized platform server a preset identifier stored in a predefined identifier database of the login server;
   receiving a login request from a platform server, wherein:
      the login request is made for access to a service server that is distinct from the login server and the platform server,
      the login request is generated by the platform server in response to receiving, from a client device that is distinct and separate from the login server, the platform server, and the service server, a request for access to the service server, and
      the platform server adds an identifier of the platform server and an identifier of the service server to the login request when generating the login request and the identifier of the platform server is included in a source website field of the login request;
   determining whether the identifier of the platform server matches the preset identifier of a respective authorized platform server of the plurality of authorized platform servers and-whether the identifier of the service server is included in the predefined identifier database;
   in accordance with a determination that the identifier of the platform server does not match the preset identifier of the respective authorized platform server, that the identifier of the service server is not included in the predefined identity database, and that a timestamp associated with the login request has timed out, denying the login request; and,
   in accordance with a determination that the identifier of the platform server matches the preset identifier of the respective authorized platform server, generating an internal signature encrypted with an internal key and sending the encrypted internal signature to the service server for accessing services hosted by the service server after the service server decrypts the internal signature successfully.

7. The login server of claim 6, wherein the one or more programs further comprise instructions for:
determining whether parameters in the login request are complete; and,
in accordance with a determination that the parameters in the login request are not complete, denying the login request.

8. The login server of claim 6, wherein the one or more programs further comprise instructions for:
initiating a decryption of an external signature;
determining whether the decryption of the external signature has successfully completed; and,
in accordance with a determination that the decryption of the external signature has not successfully completed, denying the login request.

9. The login server of claim 6, wherein the one or more programs further comprise instructions for:
in response to receiving the login request from the platform server:
   storing the login request in the memory of the login server; and
   extracting the identifier of the platform server from the login request stored in the memory of the login server.

10. The login server of claim 6, wherein the login request includes information identifying the service server.

11. A non-transitory computer readable storage medium storing one or more programs for execution by one or more processors of a login server, the one or more programs comprising instructions for:
   selecting a plurality of platform servers as authorized platform servers, and assigning each authorized platform server a preset identifier stored in a predefined identifier database of the login server;
   receiving a login request from a platform server, wherein:
      the login request is made for access to a service server that is distinct from the login server and the platform server,
      the login request is generated by the platform server in response to receiving, from a client device that is distinct and separate from the login server, the platform server, and the service server, a request for access to the service server, and
      the platform server adds an identifier of the platform server and an identifier of the service server to the login request when generating the login request and the identifier of the platform server is included in a source website field of the login request;
   determining whether the identifier of the platform server matches the preset identifier of a respective authorized platform server of the plurality of authorized platform servers and whether the identifier of the service server is included in the predefined identifier database;
   in accordance with a determination that the identifier of the platform server does not match the preset identifier of the respective authorized platform server, that the identifier of the service server is not included in the predefined identity database, and that a timestamp associated with the login request has timed out, denying the login request; and,
   in accordance with a determination that the identifier of the platform server matches the preset identifier of the respective authorized platform server, generating an internal signature encrypted with an internal key and sending the encrypted internal signature to the service server for accessing services hosted by the service server after the service server decrypts the internal signature successfully.

12. The computer readable storage medium of claim 11, wherein the one or more programs further comprise instructions for:
   determining whether parameters in the login request are complete; and,
   in accordance with a determination that the parameters in the login request are not complete, denying the login request.

13. The computer readable storage medium of claim 11, wherein the one or more programs further comprise instructions for:
   initiating a decryption of an external signature;
   determining whether the decryption of the external signature has successfully completed; and,
   in accordance with a determination that the decryption of the external signature has not successfully completed, denying the login request.

14. The computer readable storage medium of claim 11, wherein the one or more programs further comprise instructions for:
   in response to receiving the login request from the platform server:
      storing the login request in the memory of the login server; and
      extracting the identifier of the platform server from the login request stored in the memory of the login server.

15. The computer readable storage medium of claim 11, wherein the login request includes information identifying the service server.

\* \* \* \* \*